United States Patent [19]

Huber

[11] Patent Number: 5,222,089
[45] Date of Patent: Jun. 22, 1993

[54] OPTICAL SIGNAL SOURCE FOR OVERCOMING DISTORTION GENERATED BY AN OPTICAL AMPLIFIER

[75] Inventor: David R. Huber, Warrington, Pa.

[73] Assignee: General Instrument Corporation, Hatboro, Pa.

[21] Appl. No.: 817,755

[22] Filed: Jan. 8, 1992

[51] Int. Cl.[5] ............................................. H01S 3/10
[52] U.S. Cl. ...................................... 372/26; 372/31; 372/6
[58] Field of Search .................... 372/6, 26, 31, 29, 28

[56] References Cited

PUBLICATIONS

Hurer et al; "20 Channel VSB-AM CATV Link Utilizing an External Modulator, Erbium Laser and a High Power Erbium Amplifier", Technical Digest Ofc '91, IEEE/Lasers and Electro-Optics Soc. 18–22 Feb. '91.
Trisno et al, "Video Multicast Using a VSB-AM External Modulator at 1.5 μm"; IEEE Photonics Letts. vol. 3, No. 7; Jul. 1991.
E. E. Bergmann and C. Y. Kuo, "Dispersion Induced Composite Second Order Distortion in Lightwave Analog AM CATV Transmission at 1.55 um," 1990 LEOS Annual Meeting, Boston, Mass., Nov., 1990, Paper PD12.
W. I. Way, et al., "Multi-Channel AM-VSB Television Signal Transmission Using an Erbium-Doped Optical Fiber Power Amplifier," IOOC, Kobe, Japan, Jul. 20, 1989.
E. E. Bergmann, C. Y. Ruo and S. Y. Huang, "Dispersion-Induced Composite Second-Order Distortion at 1.5 um, " *IEEE Photonics Technology Letters*, vol. 3, No. 1., Jan. 1991, pp. 59–61.
C. Y. Kuo and E. E. Bergmann, "Analog Distortion in EDFA and its Electronic Compensation," *Optical Amplifiers and Their Applications*, IEEE OSA, Snow Mass Village, Colo., Jul. 24–26, 1991, Paper PdP10-1.

*Primary Examiner*—Leon Scott, Jr.
*Attorney, Agent, or Firm*—Barry R. Lipsitz

[57] ABSTRACT

An amplified signal source is provided for transmitting modulated information signals over a fiber optic communication link, which may have high fiber dispersion. A continuous wave laser produces an optical carrier at a wavelength $\lambda_1$. The optical carrier is intensity modulated to provide a substantially chirp free output signal. The output signal is amplified in an optical amplifier and coupled for transmission over a link fiber that can have a minimum dispersion at a wavelength $\lambda_2$ that is different than $\lambda_1$. The nonzero gain slope of the optical amplifier does not significantly degrade the substantially chirp free output signal.

18 Claims, 1 Drawing Sheet

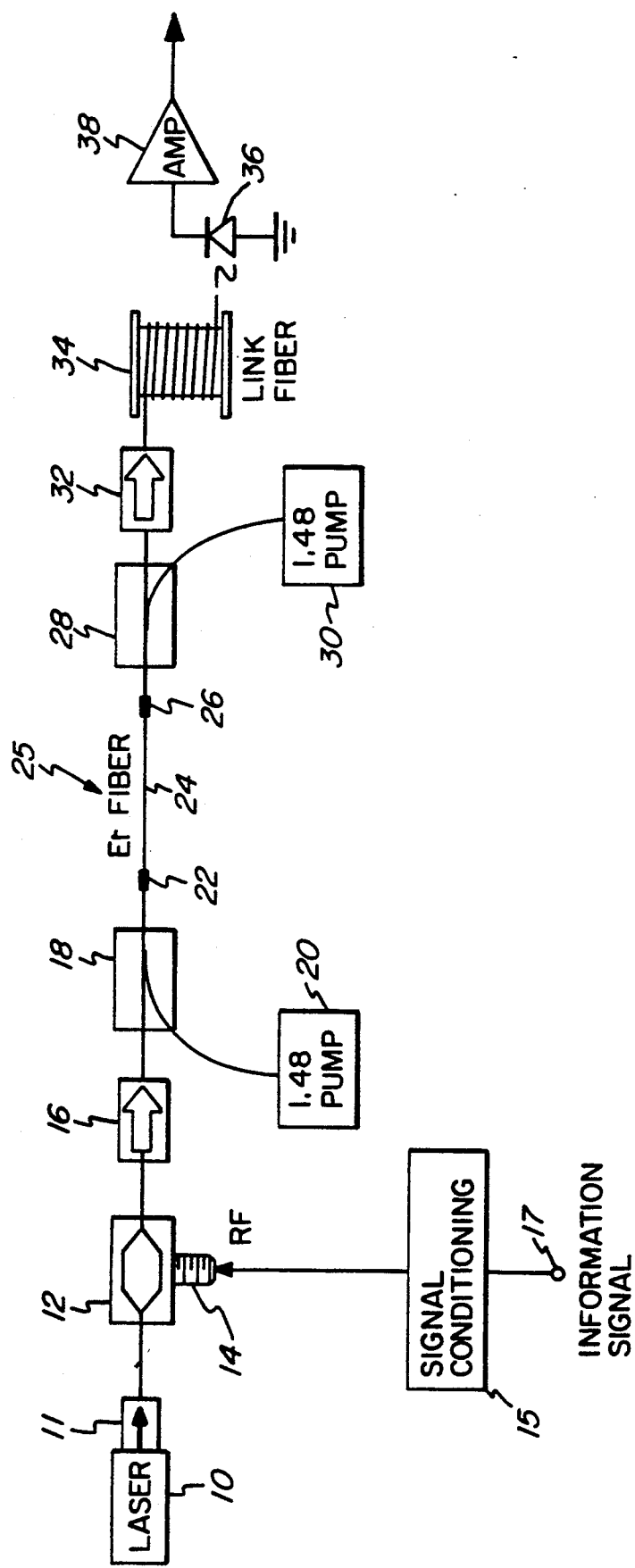

OPTICAL SIGNAL SOURCE FOR OVERCOMING DISTORTION GENERATED BY AN OPTICAL AMPLIFIER

BACKGROUND OF THE INVENTION

The present invention relates to optical fiber communication systems, and more particularly to a signal source for use in transmitting a modulated information signal over a fiber optic communication link having high fiber dispersion.

Various communication systems, such as cable television (CATV) systems, currently distribute information signals via coaxial cable. The replacement of coaxial cable with optical fiber transmission lines in such communication systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

In a CATV system, the information that is communicated is contained in a television signal. The use of a television signal comprising amplitude modulated vestigial sideband video subcarriers (VSB-AM) is preferred in the distribution of cable television signals due to the compatibility of that format with the standards of the National Television Systems Committee (NTSC) and the ability to provide an increased number of channels within a given bandwidth. An undesirable characteristic of VSB-AM transmission, however, is that it requires a much higher carrier-to-noise ratio (CNR) than other techniques, such as frequency modulation or digital transmission of video signals. Generally, a CNR of at least 40 dB is necessary to provide clear reception of VSB-AM television signals. Although VSB-AM is currently preferred for the reasons stated above, it is expected that as advances are made in technology, the transmission of FM modulated video over fiber optic communication systems will also become economically feasible and desirable.

The advent of commercially available rare earth fiber amplifiers, such as an Erbium fiber amplifier, has led to the consideration of systems that transmit VSB-AM television signals or FM modulated video signals at the optical wavelength of 1.5 μm (microns), which is the wavelength at which Erbium fiber amplifiers operate. However, most fiber links currently installed utilize fiber that has minimum dispersion near 1310 nm (about 1.3 μm) instead of the 1.5 μm operating wavelength of an Erbium fiber amplifier. In analog communication systems, this dispersion at 1.3 μm leads to high levels of distortion, and in particular to very high levels of second order distortion when laser sources are used that exhibit optical chirp. Optical chirp is defined as a rapid change in the emission wavelength of an optical source upon modulation of the source. For example, distributed feedback (DFB) and Fabry-Perot laser diodes exhibit simultaneous AM and FM modulation in the optical domain. Typical values for the FM modulation of DFB lasers is on the order of 200 MHz/mA. Actual numbers may range from 20 MHz to 800 MHz/mA, depending on the laser design. The general form for such a laser can be expressed as:

$$E[m(t)] = E_o[m(t)]\cos[w_c t + \beta \sin W_m(t)]$$

where
  $m(t)$ represents AM modulation,
  $W_c$ represents the optical carrier,
  $W_m$ represents the modulation frequency, and
  $\beta$ represents the FM modulation index.

A laser exhibiting such characteristics is said to be both intensity modulated (AM) and frequency modulated (FM). Because the cost of fiber which has minimum dispersion at 1.5 μm is higher and since some fiber having minimum dispersion near 1.3 μm is already in use in communication networks, such as CATV, it would be desirable to utilize fiber having minimum dispersion near 1.3 μm. However, applicant has discovered that if a laser having chirp (i.e., frequency modulation as well as amplitude modulation) is utilized in such a system, high levels of second order distortion will result.

If an optical amplifier is added to a optical communication system to obtain additional optical link budget, high levels of distortion, primary second order, will result if the gain spectrum of the optical amplifier is not flat. Such distortion is unacceptable in a practical system.

It is possible to provide electronic compensation to deal with the distortion generated by fiber dispersion and/or an optical amplifier having a nonzero gain slope in such a system. However, the amount of distortion compensation required is a function of fiber dispersion at the source laser operating wavelength, the length of the link fiber, and the detected signal power.

Accordingly, it would be advantageous to provide an alternative to electrical compensation in a fiber optic signal source having an optical amplifier with a nonzero gain slope. Any such alternative must be reliable and economically viable, and would advantageously also accommodate systems having link fibers with high fiber dispersion.

The present invention provides a signal source incorporating an optical amplifier without a flat (i.e., zero slope) gain spectrum, for transmitting modulated information signals over fiber optic communication links, which enjoys the aforementioned advantages.

SUMMARY OF THE INVENTION

In accordance with the present invention, a signal source is provided for transmitting a modulated information signal over a fiber optic communication link. A continuous wave laser produces an optical carrier at a wavelength $\lambda_1$. Means are provided for combining the optical carrier with an information signal to intensity modulate the optical carrier substantially free from optical frequency chirp. An optical amplifier having a nonzero gain slope is coupled to receive and amplify the intensity modulated optical carrier. Means are provided for coupling the modulated optical carrier for transmission over a link fiber.

The optical amplifier used in the signal source can comprise a rare earth fiber amplifier, such as an Erbium amplifier. Similarly, the laser can comprise a rare earth laser, such as an Erbium laser. Where an Erbium signal source is used, the wavelength $\lambda_1$ is about 1.5 microns.

The means for combining the optical carrier with an information signal can comprise an external optical modulator. In an illustrated embodiment, a Mach-Zehnder modulator is used. The Mach-Zehnder modulator is balanced to substantially eliminate optical frequency chirp. The information signal can be a VSB-AM video signal, and the signal source can further comprise means for conditioning the video signal to linearize the external optical modulator. For example, the conditioning means can predistort the video signal for input to the external optical modulator.

The signal source of the present invention can be used to communicate a signal over a link fiber that has a minimum dispersion at a wavelength $\lambda_2$ that is different than $\lambda_1$. In a specific embodiment, the laser can comprise an Erbium laser operating at a wavelength $\lambda_1$ of about 1.5 microns, with the link fiber having a minimum dispersion of a wavelength $\lambda_2$ of about 1.3 microns. The combining means comprise a substantially chirp free external optical modulator having an optical input for receiving the optical carrier, an electrical input for receiving the information signal, and an optical output for outputting the modulated optical carrier. The link fiber can comprise single mode fiber.

In another specific embodiment, the laser can comprise a rare earth laser operating at a wavelength $\lambda_1$ of about 1.3 microns, with the link fiber having a minimum dispersion at a wavelength $\lambda_2$ of about 1.5 microns. In this embodiment, the link fiber can comprise a dispersion shifted fiber.

BRIEF DESCRIPTION OF THE FIGURE

The FIGURE is a block diagram illustrating a signal source in accordance with the present invention.

DETAILED DESCRIPTION OF THE INVENTION

A linear signal source which has a high carrier-to-noise ratio (CNR) is a key component in the deployment of optical fiber communication systems, such as VSB-AM transmission systems that use Erbium doped fiber amplifiers. Previously known signal sources have been based on the direct modulation of 1.5 μm DFB laser diodes. The CNR and distortion performance available in such systems is limited by the laser diode signal sources. To improve the system dynamic range, higher power, lower relative intensity noise (RIN) lasers are necessary.

The present invention provides a signal source based on the chirp free modulation of an optical carrier. For example, the invention can be practiced using a balanced and linearized external intensity modulator, such as a 1.5 μm Mach-Zehnder modulator and a continuous wave laser, such as an Erbium doped glass laser, as the light source. Linearization of the modulator can be provided, for example, by predistorting the information signal prior to inputting it to the external modulator. Such a linearization technique is disclosed in commonly assigned, copending U.S. patent application Ser. No. 07/581,015 filed on Sep. 12, 1990 for "Apparatus and Method for Linearizing the Operation of an External Optical Modulator," incorporated herein by reference. The external optical modulator is balanced so that any optical frequency chirp of the modulated signal is negligible.

The FIGURE illustrates a signal source configuration in accordance with the present invention. In experiments conducted with this configuration, an Erbium doped glass laser having an optical power of +14 dBm was used as laser 10. The measured laser RIN is better than −165 dB/Hz. The Erbium doped glass laser 10 is followed by a polarization controller 11 so that the correct polarization of light can be fed into an external modulator 12.

An information signal, containing, for example, VSB-AM video subcarriers, is input to a terminal 17 and processed by a signal conditioning circuit 15, such as a predistortion network as taught in the aforementioned copending U.S. patent application, prior to application to the RF port 14 of external modulator 12. In the present example, a 1.5 μm lumped electrode Mach-Zehnder intensity modulator is used. Balanced Mach-Zehnder modulators of the type that can be used in accordance with the present invention are commercially available, e.g., Model MZ 315p from Crystal Technology, Inc. of Palo Alto, Calif.

The output of modulator 12 is coupled to an optical isolator 16, and from there to an optical amplifier generally designated 25 which exhibits a nonzero gain slope. Known optical amplifiers, such as the Erbium fiber amplifier 25 illustrated, typically exhibit nonzero gain slopes. This results in the amplifier having a gain spectrum that is not flat, and can introduce severe second order distortion into the signal source which renders the source virtually useless for communicating a signal over a link fiber of any practical length.

Optical amplifier 25 illustrated in the FIGURE is a type which utilizes an Erbium fiber 24 pumped at both ends by 1.48 micron pumps 20, 30, respectively, coupled to the fiber via optical couplers 18, 28, respectively. The Erbium fiber 24 is coupled to the couplers 18, 28 in a conventional manner via connectors 22, 26. It should be appreciated that other types of optical amplifiers can be substituted for the dual pumped Erbium fiber amplifier illustrated in the FIGURE. The point of the present invention is to overcome the problems introduced by the nonzero gain slope of such an optical amplifier. In this manner, the optical amplifier can be utilized to increase the distance over which an information signal can be transmitted, by increasing the signal power level.

The output of optical amplifier 25 is coupled to a link fiber 34 via an optical isolator 32. The link fiber carries the modulated optical signal output from the signal source to a receiver. The receiver includes a conventional optical detector 36 and electrical amplifier 38. The output of amplifier 38 is coupled to a user's communication appliance, such as a television (not shown).

In experiments with the configuration illustrated in the FIGURE, CNR, composite second order (CSO) distortion, and composite triple beat (CTB) distortion were measured at the output of external modulator 12, the output of amplifier 25, and the output of link fiber 34. These measurements were made using both single mode fiber (SMF) and dispersion shifted fiber (DSF) links. The source laser 10 was an Erbium glass laser with an output power of +14 dBm, operating at 1534 nm. The laser RIN was less than −170 dB/Hz. The measurements taken quantify degradations which result from the nonzero gain slope of the optical amplifier and from any laser phase to amplitude noise conversion. Fiber dispersion discriminates laser phase noise. The degradation from optical beating of reflected waves was also detected. The results of the measurements at the various points within and after the signal source were compared to identify any performance degradation. Measurements were performed using a modulation index of 4.0% per channel (20 channels total) at a detected power level of +2.8 dBm.

The measurements revealed no noticeable degradation in the CNR or of the CSO distortion using a configuration as shown in the FIGURE, which provides substantially chirp free modulation. In particular, CNR remained better than 50 dB before and after a link fiber length of about 25. For a modulating signal having a frequency at 102 MHz and an optical amplifier having an output power of +13 dBm at 1534 nm, CSO remained at approximately −69 dBc before the fiber link and after a 32.5 km length of 1.5 μm DSF fiber or a 31.6 km length of 1.3 μm SMF fiber. Such consistency in results would not be possible without the use of a substantially chirp free signal source as taught by the present invention. Indeed, signal degradation is substantial where a laser exhibiting chirp is used. Measurements with a directly modulated DFB laser, as used in the prior art, show a degradation in CSO from about −70 dBc to −45 dBc after only 4.0 km of single mode fiber.

It should now be appreciated that the present invention provides a system in which FM or AM (including VSB-AM) information signals can be communicated using an amplified signal source coupled to an optical fiber communication link that can have high fiber dispersion. In particular, a 1.5 μm VSB-AM system is demonstrated which utilizes a low RIN Erbium glass laser and a linearized balanced external modulator coupled to an optical amplifier. The nonzero gain slope of the optical amplifier does not present a problem since the modulated source signal is substantially chirp free. The lower phase noise of the Erbium glass laser minimizes the conversion of optical phase noise to amplitude noise as compared to systems that utilize distributed feedback lasers. Phase-to-amplitude noise conversion that normally results from fiber dispersion as well as from Raleigh and discrete reflections is avoided.

In a system in accordance with the present invention, no increase in CSO distortion occurs when a 1.3 μm link fiber is utilized in the 1.5 μm system. Thus, the signal source of the present invention enables the use of existing 1.3 μm fiber plants without compensation for second order distortion. A system utilizing a laser operating at a 1.3 μm wavelength with a link fiber having minimum dispersion at 1550 nm can also be successfully implemented in accordance with the present invention. And, the signal source can be used with either standard single mode fiber or dispersion shifted fiber.

Although the invention has been described in connection with a specific embodiment thereof, those skilled in the art will appreciate that numerous adaptations and modifications may be made thereto without departing from the spirit and scope of the invention as set forth in the claims. For example, a chirpless semiconductor laser could be used to provide an optical carrier. The optical carrier can be directly modulated in the chirpless laser or externally modulated for amplification and communication of the AM or FM information signal over an optical link.

What is claimed is:

1. A signal source for the transmission of an amplitude modulated information signal over a fiber optic communication link comprising:
   a continuous wave laser for producing an optical carrier at a wavelength $\lambda_1$;
   means for combining said optical carrier with an information signal to intensity modulate said optical carrier substantially free from optical frequency chirp;
   an optical amplifier having a nonzero gain slope coupled to receive and amplify the intensity modulated optical carrier; and
   means for coupling the modulated optical carrier for transmission over a link fiber;
   wherein said intensity modulated optical carrier, substantially free from optical frequency chirp, and said amplifier, which has a nonzero gain slope, provide said signal for transmission with a composite second order distortion, (CSO) of 60 decibels below carrier, (dBc) or better along said link fiber.

2. A signal source in accordance with claim 1 wherein said optical amplifier comprises a rare earth fiber amplifier.

3. A signal source in accordance with claim 2 wherein said laser is an Erbium laser.

4. A signal source in accordance with claim 3 wherein said wavelength $\lambda_1$ is about 1.5 microns.

5. A signal source in accordance with claim 4 wherein said combining means comprise an external optical modulator.

6. A signal source in accordance with claim 5 wherein said external optical modulator is a Mach-Zehnder modulator that is balanced to substantially eliminate optical frequency chirp 7. A signal source in accordance with claim 1 wherein said combining means comprise an external optical modulator.

8. A signal source in accordance with claim 7 wherein said external optical modulator is a Mach-Zehnder modulator that is balanced to substantially eliminate optical frequency chirp.

9. A signal source in accordance with claim 7 wherein said information signal is a VSB-AM video signal, said signal source further comprising means for conditioning said video signal to linearize said external optical modulator.

10. A signal source in accordance with claim 9 wherein said conditioning means predistort said video signal for input to said external optical modulator.

11. A signal source in accordance with claim 10 wherein said external optical modulator is a Mach-Zehnder modulator that is balanced to substantially eliminate optical frequency chirp.

12. A signal source in accordance with claim 1 wherein said link fiber has a minimum dispersion at a wavelength $\lambda_2$ that is different than $\lambda_1$.

13. A signal source in accordance with claim 12 wherein:
   said laser is an Erbium laser operating at a wavelength $\lambda_1$ of about 1.5 microns;
   said link fiber has a minimum dispersion at a wavelength $\lambda_2$ of about 1.3 microns; and
   said combining means comprise a substantially chirp free external optical modulator having an optical input for receiving said optical carrier, an electrical input for receiving said information signal, and an optical output for outputting the modulated optical carrier.

14. A signal source in accordance with claim 13 wherein said link fiber is single mode fiber.

15. A signal source in accordance with claim 13 wherein said external optical modulator is a Mach-Zehnder modulator that is balanced to substantially eliminate optical frequency chirp.

16. A signal source in accordance with claim 12 wherein:
   said laser is a rare earth laser operating at a wavelength $\lambda_1$ of about 1.3 microns;
   said link fiber has a minimum dispersion at a wavelength $\lambda_2$ of about 1.5 microns; and
   said combining means comprise a substantially chirp free external optical modulator having an optical input for receiving said optical carrier, an electrical input for receiving said information signal, and an optical output for outputting the modulated optical carrier.

17. A signal source in accordance with claim 16 wherein said link fiber is dispersion shifted fiber.

18. A signal source in accordance with claim 16 wherein said external optical modulator is a Mach-Zehnder modulator that is balanced to substantially eliminate optical frequency chirp.

* * * * *